Patented June 28, 1927.

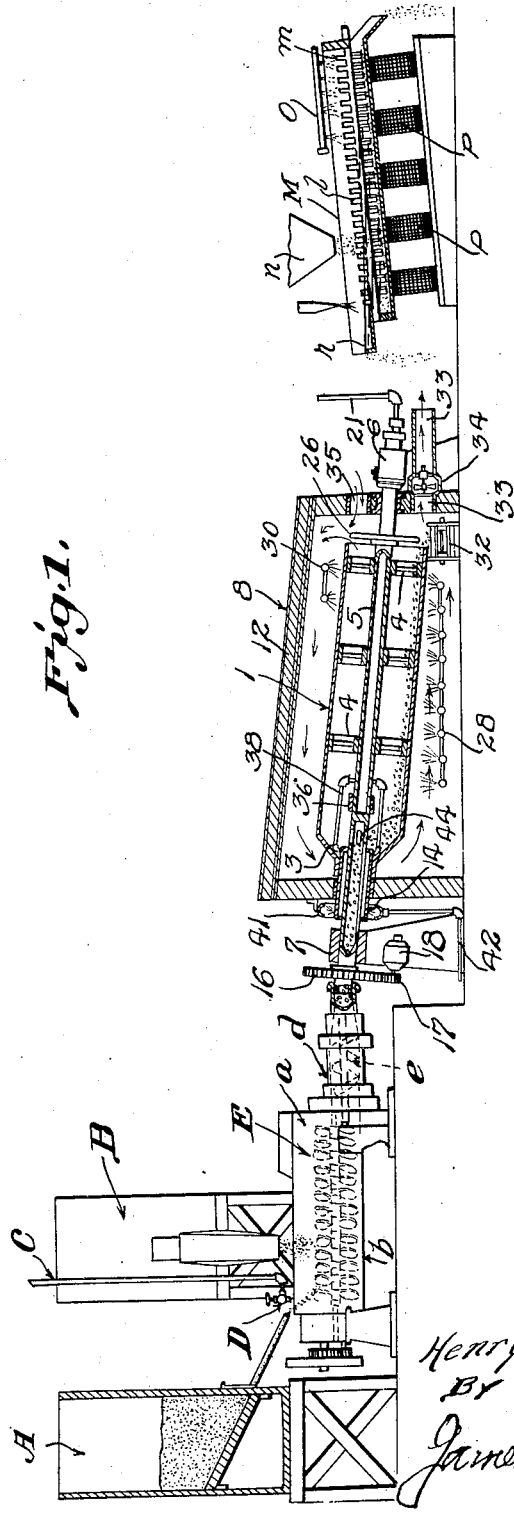

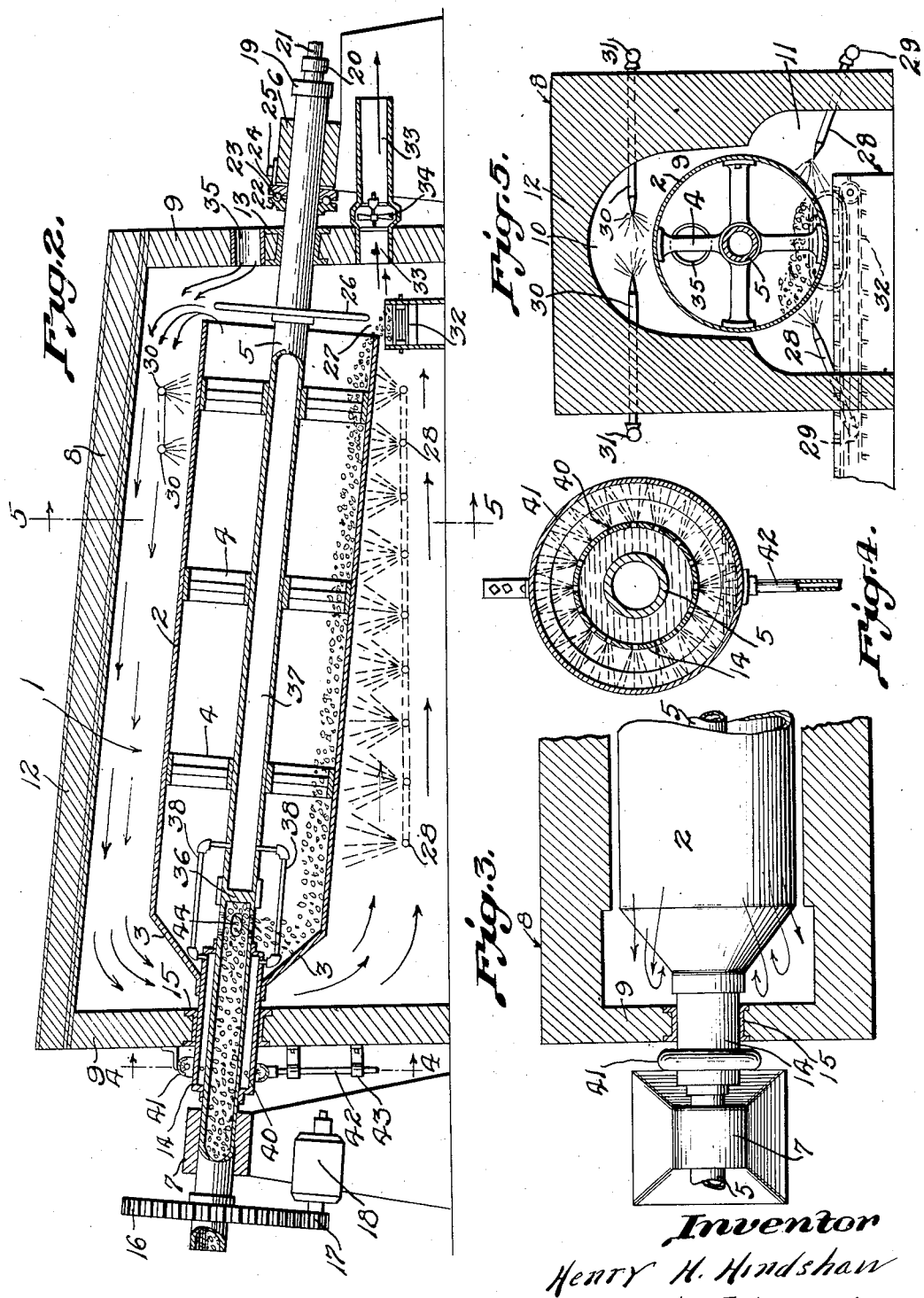

1,633,839

UNITED STATES PATENT OFFICE.

HENRY HAVELOCK HINDSHAW, OF MINNEAPOLIS, MINNESOTA, ASSIGNOR TO HINDSHAW ENGINEERING & DEVELOPMENT COMPANY, OF MINNEAPOLIS, MINNESOTA.

APPARATUS FOR UTILIZING LOW-GRADE IRON ORE.

Application filed January 24, 1921. Serial No. 439,343.

The present invention relates to an apparatus for utilizing and rendering commercially valuable low grade ores, and particularly, low grade iron ores.

Commercial iron is now obtained by smelting in a blast furnace, ores which are combined with iron, usually oxides or carbonates. These ores comprise the oxides magnetite and hematite, hematite combined with water known as limonite, and a carbonate known as siderite. These and other ores used exist in great abundance, always mixed, however, with other minerals, principally silica, alumina, sulphur and phosphorus.

Under present conditions in the art, an ore to be suitable for blast furnace use, should contain not less than 45 percent by weight of metallic iron, and also have a low content of sulphur and phosphorus. Such ores, however, exist only in comparatively limited amounts. On the other hand, immense quantities of rock bearing ore exist, containing in the aggregate from 25 to 45 percent of iron. Some of these ores have been utilized by eliminating the impurities by such means as washing, jigging, or magnetic concentration.

Magnetic concentration is a cheap and efficient method of separating iron ores from the rock or impurities in which they exist and is commercially applied on a large scale to magnetic ores.

Most of the iron ores, however, including hematite and limonite, are not sufficiently magnetic to admit of the use of this method. It has been known that the non-magnetic oxides and some other compounds of iron can be rendered magnetic by reducing the oxygen content. If such ores can be rendered magnetic, the problem of their utilization will, of course become simple, as they can then be recoverd by magnetic separation.

It has been known that hematite ores and other non-magnetic iron ores could be rendered magnetic by roasting or heating. Heretofore, however, this process has been so slow and expensive that it has never been commercially used. It is also known that if such ores are heated to too high temperature, the magnetic property induced therein will be eliminated or destroyed.

The application of this process of reduction of iron ores to a magnetic condition has, however, hitherto been considered commercially impracticable on account of its great difficulty and expense. In the present invention, a method is disclosed for cheaply and efficiently carrying out the reduction and separation of these hitherto unusable low grade iron ores, and the invention also includes the apparatus for carrying out this process.

In the iron ore formations, as they exist naturally, the iron compounds are granular or platy masses intermingled with the rock or impurities known as the gangue. The first operation is to crush the rock to approximately the size of the iron ore particles.

One of the greatest difficulties hitherto encountered in the reduction process was to heat or roast this ore mass in such a manner as to insure contact of the reducing gases with all of the iron particles. In the present invention, this object is attained by mixing a solid or liquid carbonaceous material, such as peat, lignite coal or oil while cold, or at low or ordinary temperature, with the crushed ore, then generating the reducing gas by the application of heat in the absence of air and maintaining the contact of the ore and fuel, the object being to generate the reducing gas in perfect contact with the ore particles at a temperature at which the reduction will take place.

In the embodiment of the invention selected for illustration, the reduction process is effected in a specially designed kiln forming one embodiment of the present invention. The mixture of crude materials above referred to is introduced into the kiln, with a minimum amount of air, and heat is applied to the outside of the kiln. This heat is transmitted to the material inside of the kiln and the same is heated to a high temperature and a gas readily combustible or oxidizable, is generated inside of the kiln. The generation of this gas will produce a pressure in the kiln greater than that of the outside atmosphere, so that entrance of air into the kiln is prevented. The gases generated in the kiln will be ignited and in burning or oxidizing, will possess a great affinity for oxygen. There being no supply of oxygen entering the kiln, the gases will combine with the oxygen contained in the ore. The ore will be thus reduced and the magnetic property induced therein. Owing to the intimate mixture of the ore and fuel, the gases generated will come into intimate contact with all of the ore particles, and the ore will thus be efficiently and uniformly reduced and rendered magnetic.

The exact change taking place which makes the ore magnetic is not entirely understood. It is probable that a combination of FeO and $Fe_3O$, is formed which is magnetic. It is known, however, that FeO, which has been produced in a pure state is non-magnetic. The temperature used in the present invention is not sufficiently high to smelt the ore to metallic iron nor to destroy the magnetic property induced therein.

The ore will then be discharged from the kiln and can be separated readily and easily from the gangue by the use of a magnetic separator.

While many and varied forms of apparatus might be used to carry out the process above described, one specific form has been selected for illustration. This is shown in the accompanying drawing in which like reference characters refer to the same parts throughout the different views, and in which Fig. 1 is a somewhat diagrammatic view of apparatus used in the invention, the kiln being shown in section;

Fig. 2 is a central longitudinal section of the kiln used;

Fig. 3 is a partial view of the kiln, the surrounding casing being shown in section;

Fig. 4 is a section taken on the line 4—4 of Fig. 2 looking in the direction of the arrows;

Fig. 5 is a section taken on the line 5—5 of Fig. 2, looking in the direction of the arrows.

Referring to the drawings, and particularly to Fig. 1, a bin adapted to contain the crushed ore is shown mounted upon a suitable framework. Mounted upon a similar framework is shown a fuel bin B adapted to contain fuel material which has been broken up to a suitable degree. A pipe C carrying a faucet D is shown, which is adapted to be connected to a suitable water supply.

The crushed ore and fuel, and if desired, a suitable amount of water are fed into a mixer shown as E. The mixer illustrated is intended to represent any suitable standard or commercial form of mixer, such as a well known pug and auger mill. This mill is shown as comprising a longitudinal chamber $a$, oppositely rotating series of inclined blades $b$, a discharge spout $d$ in which revolves a screw conveyor $e$ adapted to convey and discharge the material out of spout $d$. From the mixer, the material is discharged into the kiln designated generally as 1. After the ore is passed therethrough, it is run through a magnetic separator. In Fig. 1 is more or less diagrammatically shown a common commercial form of separator M comprising a trough $m$, a bin or hopper $n$ arranged to discharge material thereinto, a pipe $o$ arranged to discharge water into the trough $m$, a series of magnets $p$, and a paddle conveyor $l$ for conveying the ore to the discharge spout $q$. In this separator, the gangue is shown as being washed out at the lower end $r$ of the trough. It will, of course, be understood that any desirable or efficient form of magnetic separator may be used.

Referring now to Figs. 2 to 5, the kiln designated as 1 is seen to comprise a long open-ended cylinder 2 having at one end, converging walls 3. This cylinder is supported by means of spiders 4 upon a hollow shaft 5 extending centrally therethrough, and which shaft is journaled for rotation near its opposite end in bearing structures or supports 6 and 7. The cylinder 2 is shown as surrounded by a casing 8, a cross section of which is shown in Fig. 5. This casing will be composed of suitable heat insulating and refractory material, such as fire brick, etc. The casing 8 comprises end walls 9 and the interior thereof is formed with an upper arch portion 10 and an enlarged lower portion 11. The cylinder 2 and shaft 5 are disposed in the kiln in an inclined position, the open end of the cylinder being the lower end, and the top wall 12 of the casing being substantially parallel to the top of the inclined cylinder 2. The shaft 5 passes through the end walls of chamber 8 and at its lower end, is arranged to pass through a bushing 13 set into the wall of the chamber. A cylindrical casing 14 is mounted on shaft 5 at its upper end for a purpose to be hereinafter described, and this cylinder is mounted in a bushing 15, also set into the end wall 9 of the casing. The shaft 5 projects beyond the bearing 7 at its upper end, and has mounted thereon in rigid relation therewith, a gear 16. This gear is arranged to mesh and be driven by a pinion 17 which is shown as directly connected to some suitable motor 18 mounted on the side of bearing support 7. At its lower end, the shaft extends beyond the bearing 6 and is provided with a cap 19 formed with a reduction member 20 thereon into which is connected a pipe 21. Inside of bearing 6, the shaft 5 carries a thrust collar 22 firmly fastened thereto by any suitable means. This collar is arranged to bear upon ball bearings 23 carried between the collar 22 and a longitudinally adjustable collar 24 shown as mounted upon bearing 6 by the adjusting bolts 25. This bearing provides means for varying the longitudinal position of the cylinder 2 in the casing 8.

The lower end of cylinder 2 is partially closed by a circular plate 26 firmly secured upon shaft 5. An annular opening 27 is thus formed at the lower end of the cylinder.

Means are provided for applying heat to the cylinder 2, and such means comprises a series of pipes or nozzles 28 projecting through the walls of casing 8 into the lower chamber 11. These nozzles connect with suitable fuel supply pipes 29. At the upper part of chamber 10 in the kiln are also shown at each side thereof a pair of nozzles 30 which also extend through the walls of the casing and are connected to suitable supply pipes 31.

Material treated in the bin is adapted to be discharged at the lower end thereof through the opening 27, and beneath this opening is arranged an endless conveyor 32 suitably supported and operated by any suitable means to carry the material discharged to the outside of casing 8. In the lower part of the wall 9 at the discharge end of the casing, a discharge conduit 33 is set into the said wall and is provided with a fan 34 arranged to be operated in any suitable manner to create a current through said conduit, as indicated by the arrows in Fig. 2. Above the shaft 5 in the end wall 9 at the discharge end of the casing, an air inlet conduit 35 is set in the said wall.

It will be noted that the shaft 5 has, near the upper end of cylinder 2 a partition 36 formed therein, by means of which the lower part of the shaft is formed with a chamber 37. As previously mentioned, a cylindrical casing 14 is mounted on the upper end of the shaft and this casing extends into the casing 8 and forms the end closure for the converging walls 3 of cylinder 2. A plurality of pipes 38 are arranged to afford communication between the interior of casing 14 and chamber 37 of the shaft 5. Near the upper end of casing 14, the same has formed therethrough a series of perforations 40, and surrounding the casing at this point is an annular member 41 semi-cylindrical in cross section, as shown in Fig. 2, and a pipe 42 is connected at the lower portion of the member 41. The member 41 and pipe 42 are suitably supported upon the end wall of the casing by brackets 43.

The upper end of shaft 5 beyond the partition 36 constitutes the entrance chamber for the material to be treated in the kiln and openings 44 are formed through the walls of the pipe to form discharge outlets for the material. The operation of the apparatus is as follows:

The kiln and pipe 5 will be rotated by the motor 18 through the gears 16 and 17. The material to be treated will be introduced into the upper end of pipe 5 and be discharged into the kiln through the openings 44. This material, as previously indicated, consists of the ground and intimately mixed ore and fuel material. The fuel nozzles 28 will direct their flames upon the rotating cylinder 2. It will be understood that any desired type of burner may be used for heating the member 2, which burners can be made to be operated with air under pressure or with any other means capable of producing a high temperature. By means of the burners, the material in the kiln is thus heated to a high temperature. Hydrocarbon and other gases will be generated from the heated material and the pressure of these gases in the cylinder 2 will rise above the pressure outside of the cylinder, and the entrance of air thereinto is thus prevented.

The gases generated in the cylinder 2 will pass out of same at the top of opening 27, as indicated by the arrows in Fig. 2. These gases will be mixed with air which is drawn into the casing chamber through the conduit 35 and the mixture of gases and air will be ignited by the fuel nozzles 30. This burning mixture will be drawn around the cylinder 2, and the kiln will thus be practically surrounded by flames, as shown by the arrows in Fig. 2. The burned gases will be drawn out of conduit 33 by the suction fan 34. The hot carbon and carbonaceous material mixed with the ore will be so heated that it will readily oxidize and extract the necessary oxygen for this purpose from the ore material with which it is intimately mixed and in contact. The ore is thus reduced and rendered magnetic.

The reduced ore is discharged at the lower portion of the opening 27 and falls on the conveyor 32 by which it is conveyed outside of the casing chamber and is then ready to be operated upon by the magnetic separator.

In order to maintain the pipe 5 at a reasonably low temperature, water is circulated therethrough. Water is introduced into pipe 21 by a pump or other suitable means and is forced up through the pipe into chamber 37 and passes therefrom, through the pipes 38 into the interior of drum 14. From drum 14, the water is sprayed out through the perforations 40 and is collected by member 41 and conveyed away to any desired point by means of pipe 42. This water will be considerably heated and can be used as feed water for boilers, or for any other convenient or desired purpose.

The reduced ore, when coming from the kiln, is ready to be treated in the magnetic separator. As previously stated, any efficient and commercial form of magnetic separator can be used. The ore and gangue are still mixed together but the ore has been rendered magnetic so that it can now be easily and cheaply separated from the gangue. Before the treatment in the kiln, it was impossible to separate the ore and gangue profitably by any known process or means. The separated ore is now high in percentage of iron and forms a valuable and high grade product for blast furnace use.

It will now be apparent that applicant has invented a very efficient apparatus by which low grade iron ores, hitherto unusable, can be converted into valuable and commercial products. The deposits of this low grade iron ore in the State of Minnesota, alone, comprise millions of tons which will be rendered available by the present apparatus. It will thus readily be seen that the invention will be of immense benefit to the country. When the present high price of iron and steel is considered, the importance of the invention will become all the more apparent.

While the invention has been described as particularly directed to the treatment of iron ore, it will be understood that ores of other metals capable of similar reduction and magnetization may be treated by the present apparatus.

It will, of course, be understood that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. An apparatus for treating low grade iron ore comprising a heating chamber, an inclined open-ended cylindrical kiln rotatably mounted therein, a hollow shaft supporting said member, means for feeding material into said hollow shaft and thence into the kiln at the upper end thereof, heating means disposed in said chamber below said kiln, a circular plate of smaller diameter than said kiln disposed near the open end thereof, whereby an annular outlet is formed at the end of said cylinder, the ore being discharged at the bottom of said outlet, and gases which are formed will be discharged at the upper end of said outlet.

2. An apparatus for treating low grade iron ore comprising a heating chamber, a longitudinally inclined hollow rotatable shaft passing therethrough, an open-ended cylindrical kiln in said chamber rigidly secured to said shaft, said shaft having means at its upper end through which material is introduced into said kiln, a circular plate secured to said shaft near the open end of said kiln and forming an annular outlet therefor, heating means below said kiln, an inlet conduit for admitting air into said chamber, an outlet conduit for exhausting the burned gases from the chamber, and an igniting means adjacent to inlet conduit and the upper portion of said annular outlet of said kiln.

3. An apparatus for treating low grade iron ore comprising an inclined open-ended cylindrical kiln, heating means therefor, an inclined hollow rotatable shaft passing therethrough and upon which said kiln is rigidly supported, a dividing member in said hollow shaft near the upper end thereof, a cylindrical casing surrounding said shaft above said dividing member, said casing having a series of perforations therein near its upper end, a plurality of conduits connecting said cylindrical casing with the interior of the hollow shaft below the dividing member, whereby a circulation of cooling fluid may be passed into the lower end of said hollow shaft through said conduits into the cylindrical casing and out through the perforations therein and means for feeding material to said cylindrical casing through said hollow rotatable shaft.

4. An apparatus for reducing iron ore comprising a heating chamber, a hollow longitudinally inclined rotatable shaft extending therethrough, an open ended inclined cylindrical kiln rigidly secured to said shaft, a bearing for said shaft outside of the chamber at its upper end, a bearing for said shaft outside of the chamber at its lower end, and an adjustable thrust bearing for said shaft adjacent the bearing at its lower end, whereby the position of said shaft and kiln in said heating chamber may be varied.

5. An apparatus for reducing ore comprising a longitudinally inclined hollow rotatable shaft, a cylindrical kiln supported thereby and rigidly secured thereto, a partition near the upper end of said shaft dividing the same into upper and lower chambers, said upper chamber having means for feeding the material to be treated into said kiln, a cap for the lower end of said shaft having a conduit communicating therewith, a cylindrical casing surrounding the upper chamber of said shaft, a plurality of conduits connecting said casing with the lower chamber of said shaft, said casing having a plurality of perforations formed near its upper end, a collecting ring of approximately semicircular cross section surrounding said perforations and a conduit connected to the lower side of said ring whereby circulation of cooling fluid may be maintained through the first mentioned conduit into said lower chamber and shaft through the plurality of conduits into the cylindrical casing, through the perforations thereof into the collecting ring, and out of said last mentioned conduit.

In testimony whereof I affix my signature.

HENRY HAVELOCK HINDSHAW.